(12) United States Patent
Kim

(10) Patent No.: US 10,317,039 B2
(45) Date of Patent: Jun. 11, 2019

(54) VEHICLE LAMP

(71) Applicant: LG INNOTEK CO., LTD., Seoul (KR)

(72) Inventor: Ji Hoon Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 197 days.

(21) Appl. No.: 15/329,560

(22) PCT Filed: Jul. 31, 2015

(86) PCT No.: PCT/KR2015/008041
§ 371 (c)(1),
(2) Date: Jan. 26, 2017

(87) PCT Pub. No.: WO2016/018120
PCT Pub. Date: Feb. 4, 2016

(65) Prior Publication Data
US 2018/0224084 A1    Aug. 9, 2018

(30) Foreign Application Priority Data
Jul. 31, 2014  (KR) .......................... 10-2014-0098437

(51) Int. Cl.
*F21S 45/47* (2018.01)
*F21S 43/00* (2018.01)
(Continued)

(52) U.S. Cl.
CPC ............ *F21S 45/47* (2018.01); *B60Q 1/0041* (2013.01); *F21S 41/141* (2018.01); *F21S 41/192* (2018.01);
(Continued)

(58) Field of Classification Search
None
See application file for complete search history.

(56) References Cited

U.S. PATENT DOCUMENTS

2007/0076422 A1*  4/2007  Nicolai ................ B60Q 1/0041
                                                362/547
2009/0059594 A1*  3/2009  Lin ............................ F21K 9/00
                                                362/294

(Continued)

FOREIGN PATENT DOCUMENTS

KR    10-2014-0003029    1/2014
KR    10-1371539         3/2014
KR    10-1397604         5/2014

OTHER PUBLICATIONS

International Search Report (with English translation) and Written Opinion dated Nov. 16, 2015 issued in Application No. PCT/KR2015/008041.

*Primary Examiner* — Elmito Breval
(74) *Attorney, Agent, or Firm* — Ked & Associates, LP

(57) ABSTRACT

The present invention provides a vehicle lamp including a first lamp and a second lamp, only one of which is selectively turned on; a first bezel unit made of a thermally conductive material, including a thermal radiation region exposed to the outside, and connected to the first lamp to be thermally conductive therewith; and a second bezel unit connected to the first bezel unit to be thermally conductive therewith, made of a thermally conductive material, including a thermal radiation region exposed to the outside, and connected to the second lamp to be thermally conductive therewith, and provides effects in that thermal radiation efficiency is increased and a space advantageous for designing a lamp is secured because heat generated by a light source is discharged to the atmosphere through thermal radiation and cooling components, such as a radiation fin and an additional fan, are eliminable.

10 Claims, 4 Drawing Sheets

(51) Int. Cl.
*F21S 41/141* (2018.01)
*F21S 43/19* (2018.01)
*B60Q 1/00* (2006.01)
*F21S 41/19* (2018.01)
*F21S 43/14* (2018.01)
*F21W 103/55* (2018.01)
*F21W 102/13* (2018.01)

(52) U.S. Cl.
CPC ............... *F21S 43/00* (2018.01); *F21S 43/14* (2018.01); *F21S 43/195* (2018.01); *F21W 2102/13* (2018.01); *F21W 2103/55* (2018.01)

(56) References Cited

U.S. PATENT DOCUMENTS

| | | | |
|---|---|---|---|
| 2010/0296306 A1 | 11/2010 | Toyoyama et al. | |
| 2012/0134167 A1* | 5/2012 | Huang | B60Q 1/0041 362/519 |
| 2015/0323145 A1* | 11/2015 | Kanayama | F21S 41/24 362/487 |

* cited by examiner

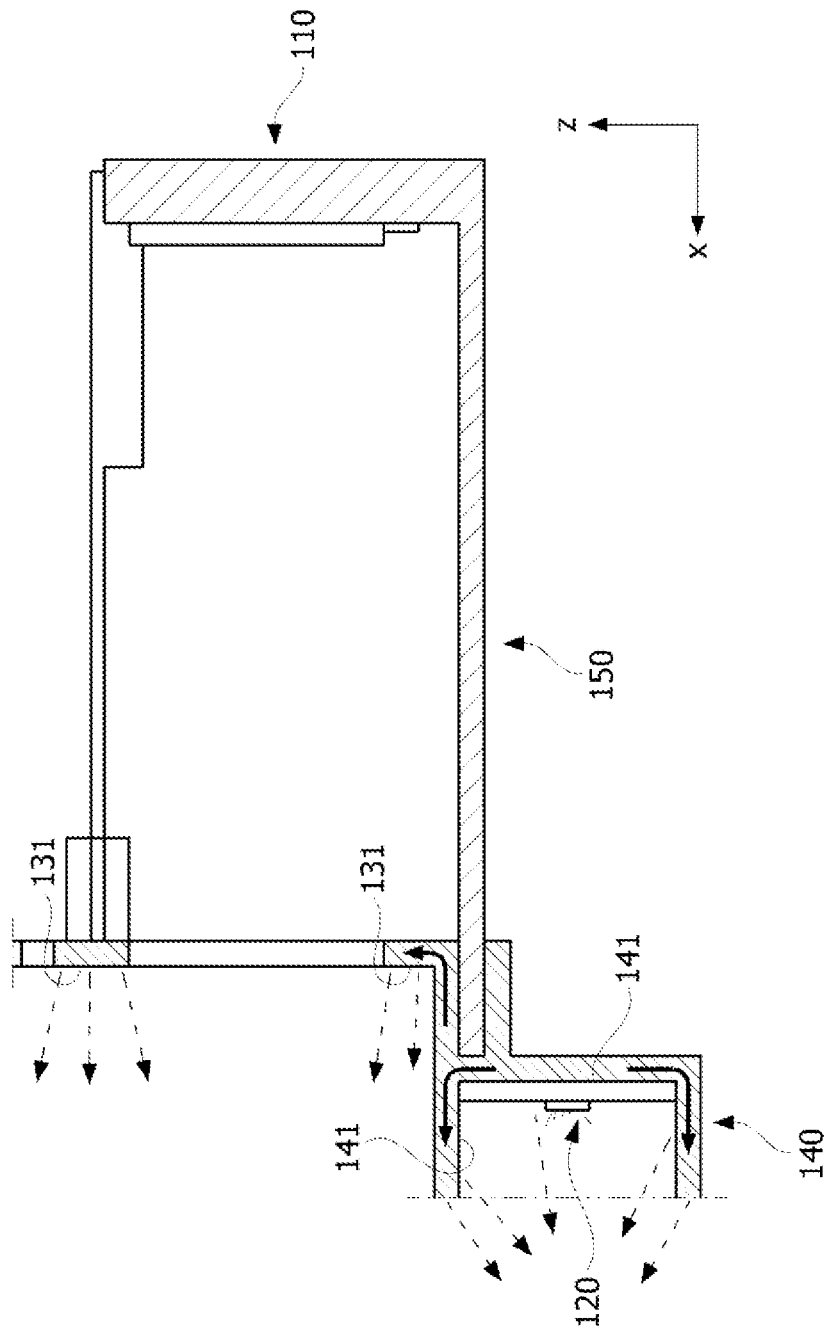

VEHICLE LAMP

CROSS-REFERENCE TO RELATED PATENT APPLICATIONS

This application is a U.S. National Stage Application under 35 U.S.C. § 371 of PCT Application No. PCT/KR2015/008041, filed Jul. 31, 2015, which claims priority to Korean Patent Application No. 10-2014-0098437, filed Jul. 31, 2014, whose entire disclosures are hereby incorporated by reference.

TECHNICAL FIELD

The present invention relates to a vehicle lamp, and more particularly, to a vehicle lamp including a heat sink unit.

BACKGROUND ART

Generally, vehicle lamps are mainly classified into a head lamp installed at the front of a vehicle and a tail lamp installed at the rear of a vehicle. Head lamps are generally mounted at both sides of the front of a vehicle to secure visibility of a driver in a traveling direction when the driver drives at night.

Light emitting diodes (LEDs) can be used as a light source of a recent vehicle lamp. Since a color temperature of a vehicle lamp using LEDs is approximately 5500 K, which is similar to that of sunlight, there is an advantage in minimizing fatigue of human eyes. In addition, since a vehicle lamp including LEDs is small, a degree of freedom of lamp design is high, and the lamp is also economical due to its semi-permanent lifetime.

Such LEDs are typically manufactured in a module form. In addition, the LED module is assembled with an LED heat sink module to suitably dissipate heat radiated from the LED. Generally, the LED heat sink module has a shape of a planar plate in which a plurality of cooling fins protrude from one side surface thereof. In addition, convection cooling is performed when the cooling fin is cooled by air being introduced by a fan disposed behind the lamp.

However, a cooling structure of the vehicle lamp has a problem in that a spatial limitation in lamp design is significant because a fan and a convention space have to be provided behind the lamp.

DISCLOSURE

Technical Problem

The present invention is directed to providing a vehicle lamp capable of securing thermal radiation efficiency and eliminating a spatial limitation in lamp design.

The scope of the present invention is not limited to the above-described objects, and other unmentioned objects may be clearly understood by those skilled in the art from the following descriptions.

Technical Solution

One aspect of the present invention provides a vehicle lamp including a first lamp and a second lamp, only one of which is selectively turned on, a first bezel unit made of a thermally conductive material, including a thermal radiation region exposed to the outside, and connected to the first lamp to be thermally conductive therewith, and a second bezel unit connected to the first bezel unit to be thermally conductive therewith, made of a thermally conductive material, including a thermal radiation region exposed to the outside, and connected to the second lamp to be thermally conductive therewith.

The vehicle lamp may further include a heat transfer member configured to connect one of the first bezel unit and the second bezel unit to the first lamp.

The second lamp may be in contact with the second bezel unit.

The first bezel unit and the second bezel unit may be vertically disposed.

The first bezel unit and the second bezel unit may be respectively disposed above and below the heat transfer member.

A slot, which is recessed and in which the heat transfer member is inserted, is formed at one of the first bezel unit and the second bezel unit.

One portion of a plurality of lamp modules of the first lamp and the second lamp may be disposed in a line in a first direction, and the first bezel unit and the second bezel unit may be formed to be elongated in the first direction.

The other portion of the plurality of lamp modules of the first lamp and the second lamp may be disposed in a line in a second direction perpendicular to the first direction, and the first bezel unit and the second bezel unit may be formed to be elongated in the second direction.

At least one of the first light source and the second light source may include a light emitting diode.

Advantageous Effects

According to one embodiment of the present invention, since a bezel unit, which is made of a thermally conductive material and includes a thermal radiation region, is thermally conductively coupled to a light source, heat generated by the light source is radiated to the atmosphere through thermal radiation and there are effects in that thermal radiation efficiency is increased and a space advantageous for designing a lamp is secured because a cooling component such as a radiation fin and an additional fan can be eliminated.

In addition, according to one embodiment of the present invention, since a first bezel unit and a second bezel unit are thermally conductively coupled to share a thermal radiation region, there is an advantageous effect in that heat generated by a light source can be effectively radiated. In addition, since the thermal radiation region is shared by the first bezel unit and the second bezel unit, advantageous effects in that weight can be decreased, manufacturing processes can be reduced, and manufacturing cost can be decreased are provided because one of cooling components such as a radiation plate and a fan of the light source can be eliminated.

DESCRIPTION OF DRAWINGS

FIG. 3 is a view illustrating a heat sink path when a first light source is selectively turned on.

FIG. 4 is a view illustrating a heat sink path when a second light source is selectively turned on.

MODES OF THE INVENTION

Hereinafter, an exemplary embodiment of the present invention will be described with reference to the accompanying drawings in detail. Purposes, specific advantages, and novel features of the invention will be made clear from exemplary embodiments and the following detailed description in connection with the accompanying drawings. Terms and words used in this specification and claims thereof are not to be interpreted as limited to commonly used meanings or meanings in dictionaries, and should be interpreted as having meanings and concepts which are consistent with the technological scope of the invention based on the principle that the inventors have appropriately defined concepts of terms in order to describe the invention in the best way. In the description of the invention, when it is determined that detailed descriptions of related well-known functions unnecessarily obscure the gist of the invention, the detailed descriptions thereof will be omitted.

The terminology used herein to describe embodiments of the invention is not intended to limit the scope of the invention. The articles "a" and "an" are singular in that they have a single referent, however the use of the singular form in the present document does not preclude the presence of more than one referent. In other words, elements of the invention referred to in the singular may number one or more unless context clearly indicates otherwise. It should be further understood that the terms "comprise," "comprising," "include," and/or "including" specify the presence of stated features, numbers, steps, operations, elements, and/or components when used herein, but do not preclude the presence or addition of one or more other features, numbers, steps, operations, elements, components, and/or groups thereof.

When a light emitting diode (LED) is used as a light source of a vehicle lamp, a unit configured to discharge heat generated by the LED is necessarily provided. This is because the LED is a component which generates much heat, and thus a lifetime of the LED may be decreased due to a high temperature heat that is radiated. Conventionally, a structure in which a radiation fin is disposed on an LED substrate and a fan for blowing air is included therein is provided behind the lamp as a heat sink unit. However, such a heat sink unit causes a large spatial limitation in lamp design for enhancing aesthetics.

Meanwhile, while there are lamps that are simultaneously turned on among vehicle lamps, there are lamps (for example, low beams and daytime running lights (DRLs)) that are selectively turned on. A vehicle lamp according to one exemplary embodiment of the present invention is proposed for the purpose of sharing a heat sink unit of a light source selectively turned on and discharging heat generated by an LED to an outside of the vehicle rather than an inside thereof to solve such a spatial limitation.

Figure 1:
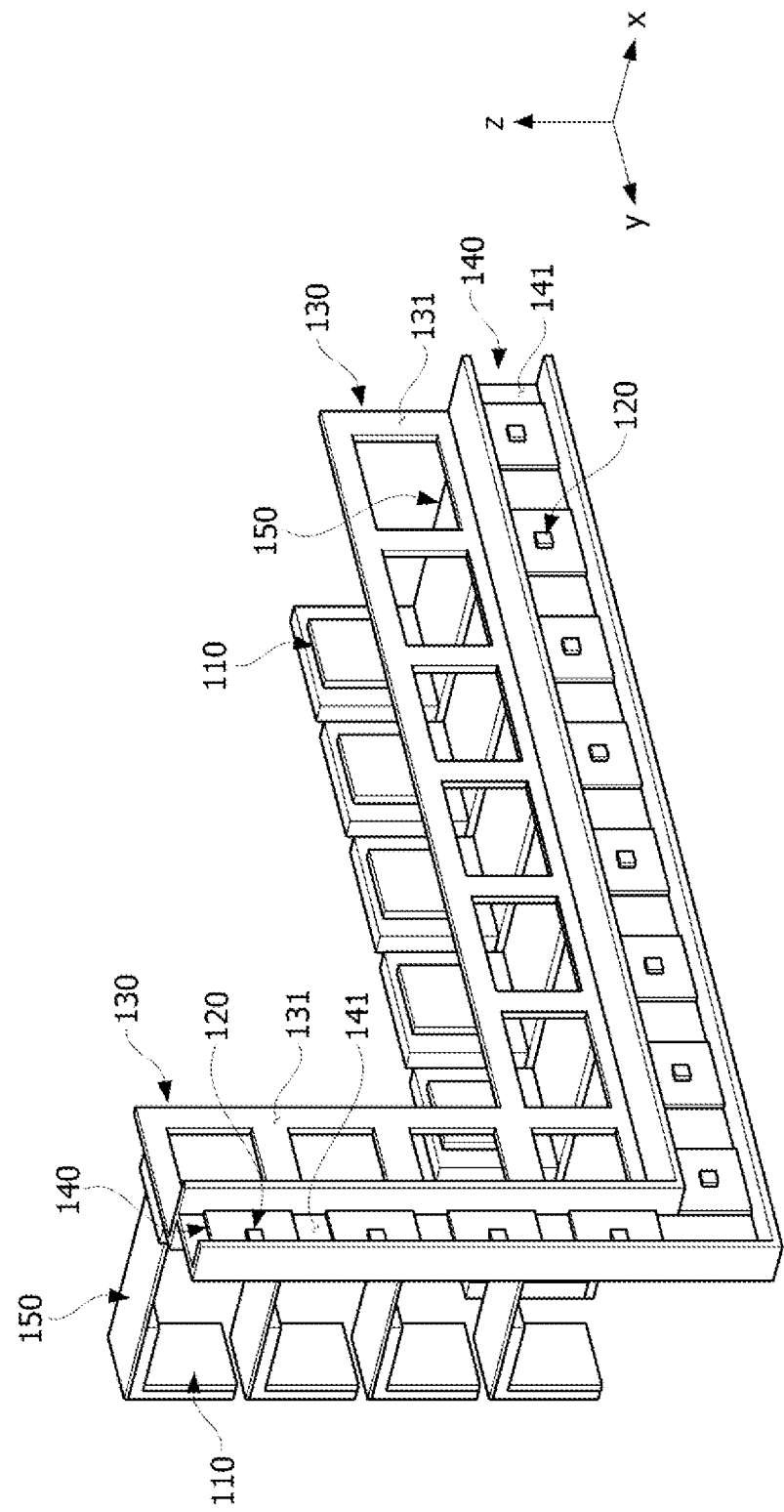
FIG. 1 is a view illustrating a vehicle lamp according to one exemplary embodiment of the present invention.
Figure 2:
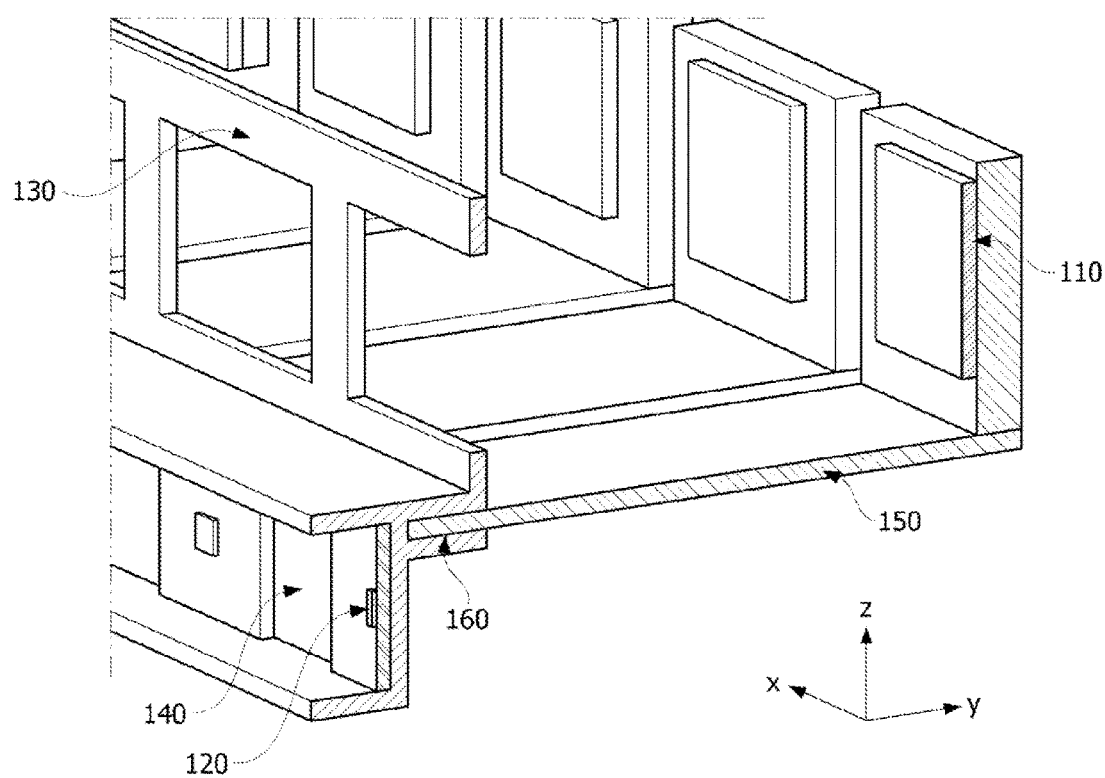
FIG. 2 is a view illustrating details of a first bezel unit, a second bezel unit, and a heat transfer member illustrated in FIG. 1.

FIG. 1 is a view illustrating a vehicle lamp according to one exemplary embodiment of the present invention, and FIG. 2 is a view illustrating details of a first bezel unit, a second bezel unit, and a heat transfer member illustrated in FIG. 1. FIGS. 1 to 2 are views clearly illustrating main features for a clear conceptual understanding of the present invention, and as a result, various modifications are expected and the scope of the present invention is not limited to specific shapes illustrated in the drawings.

Referring to FIGS. 1 and 2 together, the vehicle lamp according to one exemplary embodiment the present invention may include first lamps 110, second lamps 120, a first bezel unit 130, a second bezel unit 140, and a heat transfer member 150.

First, the first lamp 110 may include an LED as a light source and may be a head lamp of a vehicle serving as a low beam. In addition, the first lamp 110 may be made of an LED array. Here, the LED array is a type of a light source including a lamp module in which a plurality of LEDs are mounted, and may directly implement various beam patterns by selectively turning on the LEDs. Accordingly, the LED array may be applied to a head lamp and a rear lamp of a vehicle and effectively used for implementing various beam patterns.

Meanwhile, one portion of lamp modules in which the LEDs are mounted as the first lamps 110 may be laterally arranged and disposed, and the other portion thereof may be longitudinally arranged and disposed.

In addition, the second lamp 120 may be a DRL.

Typically, since the low beam and the DRL are not simultaneously turned on, a heat sink unit may be shared.

The low beam and the DRL are exemplified in the description of the first lamps 110 and the second lamps 120 of the present invention, but the present invention is not limited thereto, and first lamps 110 and the second lamps 120 may correspond to various lamps applied to vehicles.

The first bezel unit 130 and the second bezel unit 140 may be made of a thermally conductive material and respectively include thermal radiation regions 131 and 141. The thermal radiation regions 131 and 141 are disposed to face a lens and serve to discharge heat transferred from the LEDs to the atmosphere through thermal radiation. A front end portion of the first bezel unit 130 may be disposed to face the first lamp 110 and formed in a frame type in which a space is formed so that the lens may be inserted into the space.

The first bezel unit 130 may be provided to start extending from a front end portion thereof up to a radiation plate of the first lamps 110 to be connected thereto, support the first lamps 110, and also receive heat generated by the first lamp 110. Alternatively, in another embodiment, the heat transfer member 150 may also be installed between the first bezel unit 130 and the first lamp 110.

Since a rear end portion of the heat transfer member 150 is coupled to the first lamp 110 and the front end portion is coupled to the first bezel unit 130, the heat transfer member 150 may serve to conduct heat generated by the first lamp 110 to the first bezel unit 130.

Meanwhile, the front end portion of the heat transfer member 150 may also be coupled to the second bezel unit 140. Here, as illustrated in FIG. 2, a slot 160 in which the front end portion of the heat transfer member 150 is inserted may be formed at the second bezel unit 140. Such a slot 160 is for increasing a coupling force between the first bezel unit 130 or the second bezel unit 140 and the heat transfer member 150 and also increasing thermal conductivity by increasing a contact area therebetween.

The second bezel unit 140 may be disposed below the first bezel unit 130 to be provided in a multilayer structure and in contact with and coupled to the first bezel unit 130 to be thermally conductive therewith. Specifically, the first bezel unit 130 and the second bezel unit 140 may be respectively disposed above and below the heat transfer member 150.

Meanwhile, the second bezel unit 140 and the first bezel unit 130 are described as being divided according to a shape and a functional feature, but may be formed to be vertically connected to each other and integrated. The second lamp 120 may be directly coupled to a front surface of the second bezel unit 140. Since the second lamp 120 is directly coupled to the second bezel unit 140, an additional radiation plate is not necessary.

The first bezel unit 130 and the second bezel unit 140 may be disposed to be elongated in a lateral or longitudinal direction to correspond to positions of the lamp modules of the first lamps 110 and the second lamps 120.

Figure 3:
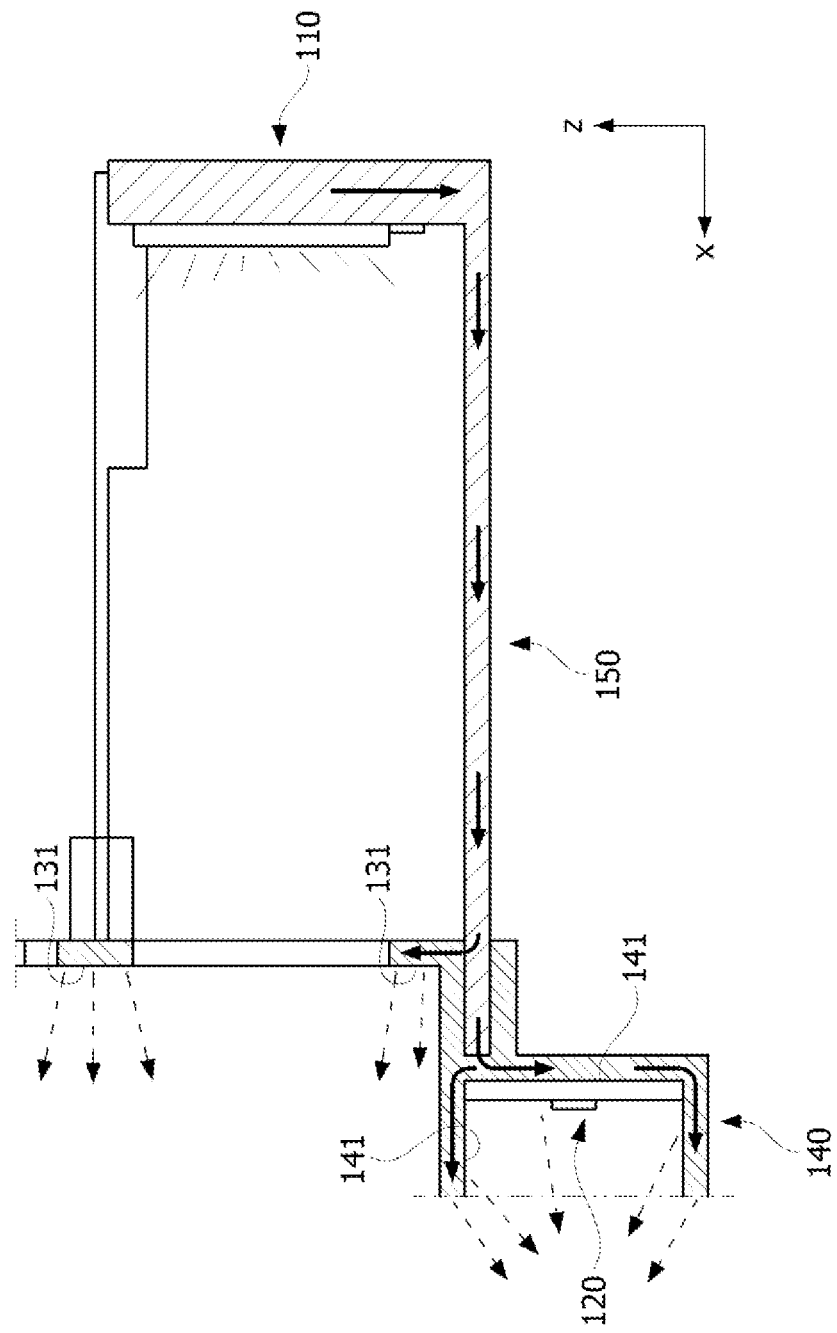

FIG. 3 is a view illustrating a heat sink path when a first light source is selectively turned on, and FIG. 4 is a view illustrating a heat sink path when a second light source is selectively turned on.

Hereinafter, a heat sink process of heat generated by the first lamp 110 or the second lamp 120 will be described with reference to FIGS. 3 and 4.

In one embodiment, one of the first lamps 110 and the second lamps 120 respectively provided as the low beam and the DRL may be selectively turned on.

Specifically, as illustrated in FIG. 3, when the first lamps 110 are turned on and the second lamps 120 are turned off, heat generated by the first lamps 110 is transferred to the first bezel unit 130 and the second bezel unit 140 through the heat transfer member 150 by way of thermal conduction. The heat transferred to the first bezel unit 130 and the second bezel unit 140 is discharged to the atmosphere through the thermal radiation regions 131 and 141 by way of thermal radiation. Since the heat generated by the first lamp 110 is discharged through the first bezel unit 130 and also discharged through the second bezel unit 140 as described above, a heat sink effect is excellent.

Referring to FIG. 4, when the second lamps 120 are turned on and the first lamps 110 are turned off, heat generated by the second lamp 120 is discharged to the atmosphere through the thermal radiation region 141 of the second bezel unit 140 by way of thermal radiation. In addition, the heat generated by the second lamp 120 is transferred to the first bezel unit 130 through the second bezel unit 140 and discharged to the atmosphere through the thermal radiation region 131 by way of thermal radiation. Since the heat generated by the second lamp 120 is discharged through the second bezel unit 140 and is also discharged through the first bezel unit 130 as described above, a heat sink effect is excellent.

The vehicle lamp according to one exemplary embodiment of the present invention has been specifically described above with reference to the accompanying drawings.

While the present invention has been particularly described with reference to exemplary embodiments, those skilled in the art should understand that various changes in form and details may be made without departing from the spirit and scope of the present invention. Therefore, the exemplary embodiments should be considered in a descriptive sense only and not for purposes of limitation. The scope of the invention is defined not by the detailed description of the invention but by the appended claims, and encompasses all modifications and equivalents that fall within the scope of the appended claims.

REFERENCE NUMERALS

110: FIRST LAMP
120: SECOND LAMP
130: FIRST BEZEL UNIT
131,141: THERMAL RADIATION REGION
140: SECOND BEZEL UNIT
150: HEAT TRANSFER MEMBER

The invention claimed is:

1. A vehicle lamp comprising:
   a first lamp and a second lamp, only one of which is selectively turned on;
   a first bezel made of a thermally conductive material, including a thermal radiation region exposed to an outside, and including an opening;
   a second bezel connected to the first bezel to be thermally conductive therewith, made of a thermally conductive material, including a thermal radiation region exposed to the outside, and connected to the second lamp to be thermally conductive therewith; and
   an arm that connects the first lamp to at least one of the first bezel or the second bezel and positions the first lamp a prescribed distance from the first bezel,
   wherein the arm transmits heat generated from the first lamp to the first bezel, and the first bezel dissipates the heat into the air, and
   wherein the first lamp emits light through the opening in the first bezel.

2. The vehicle lamp of claim 1, wherein the second lamp is in contact with the second bezel.

3. The vehicle lamp of claim 1, wherein the first bezel and the second bezel are vertically disposed.

4. The vehicle lamp of claim 3, wherein the second bezel and the first bezel are integrated into a single component, the arm positions the first lamp the prescribed distance from a rear surface of the at least one of the first bezel or the second bezel, and the second lamp is provided in a front surface of the second bezel.

5. The vehicle lamp of claim 3, wherein the first bezel and the second bezel are respectively disposed above and below the arm.

6. The vehicle lamp of claim 1, wherein a slot, which is recessed and in which a portion of the arm is inserted, is formed in the at one of the first bezel or the second bezel.

7. The vehicle lamp of claim 1, wherein one portion of a plurality of lamp modules of the first lamp and the second lamp are disposed in a line in a first direction, and the first bezel and the second bezel are formed to be elongated in the first direction.

8. The vehicle lamp of claim 7, wherein another portion of the plurality of lamp modules of the first lamp and the second lamp are disposed in a line in a second direction perpendicular to the first direction, and the first bezel and the second bezel are formed to be elongated in the second direction.

9. The vehicle lamp of claim 1, wherein one or more of the first light source or the second light source includes a light emitting diode.

10. The vehicle lamp of claim 1, wherein a front end portion of the first bezel is provided to face the first lamp, and a lens is disposed inside the first bezel.

* * * * *